E. CULVER.
Meat and Vegetable Cutter and Grater.
No. 43,837. Patented Aug. 16, 1864.
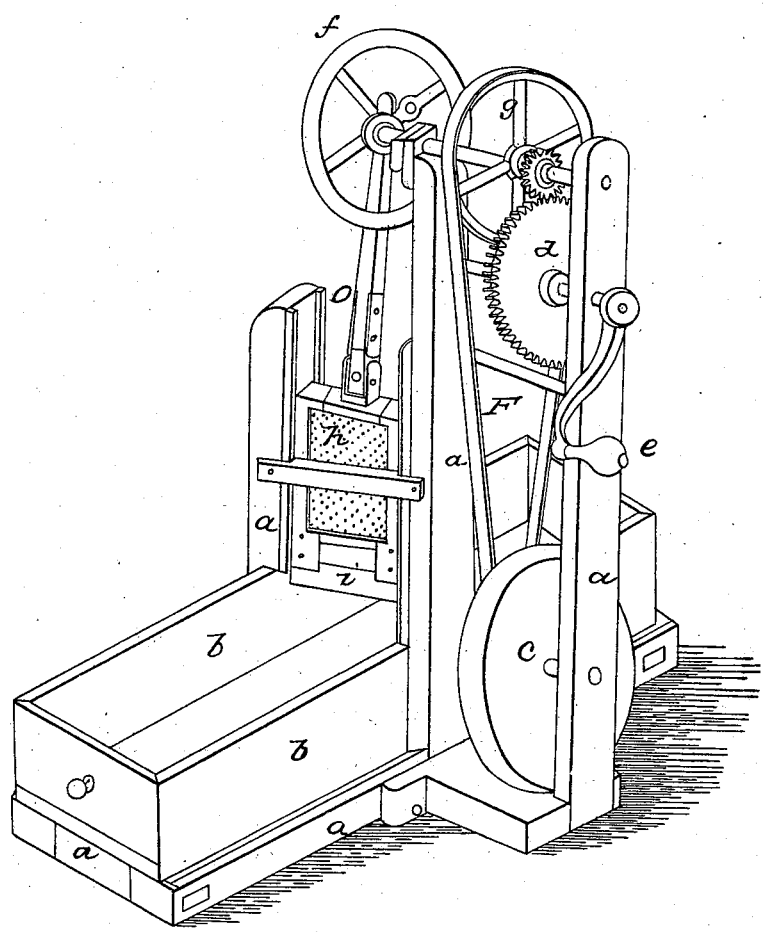
WITNESSES
Arthur Maxwell
Wm B Caswell
INVENTOR
Ephraim Culver

UNITED STATES PATENT OFFICE.

EPHRAIM CULVER, OF SHELBURNE, MASSACHUSETTS.

IMPROVED MEAT AND VEGETABLE CUTTER AND GRATER.

Specification forming part of Letters Patent No. 43,837, dated August 16, 1864.

*To all whom it may concern:*

Be it known that I, EPHRAIM CULVER, of Shelburne, in the county of Franklin and State of Massachusetts, have invented a new and useful machine for cutting and slicing or grating meats, fruits, vegetables, and other substances, and for cleaning and polishing cutlery and other hardware; and I do hereby declare that the following is a full and exact description thereof, reference being had to the accompanying drawing, and to the letters of reference marked thereon.

The nature of my invention consists in combining and arranging a movable trough with a movable knife and a movable grater and a polishing-wheel, so that the operations of cutting and slicing and grating and polishing may be performed at one and the same time or separately.

To enable others to make and use my invention, I will proceed to describe its construction and operation.

My machine consists of a frame, (marked $a$ $a$ $a$,) to which are attached the movable trough $b$ and the polishing-wheel $c$ and the grater $h$ and the knife $i$. By turning the crank $e$ motion is communicated through the cog-wheel $d$ and the wheels $g$ and $j$ and the belt F and the connecting-rod $o$ to the grater $h$ and the knife $i$ and the polishing-wheel $c$, so that the polishing-wheel $c$ revolves, and the grater $h$ and knife $i$ alternately ascend and descend.

What I claim as my invention, and desire to secure by Letters Patent, is—

The combination and arrangement of the trough $b$ with the knife $i$ and the grater $h$ and the polishing-wheel $c$, substantially as and for the purposes herein set forth.

EPHRAIM CULVER.

Witnesses:
ARTHUR MAXWELL,
WM. B. CASWELL.